(12) United States Patent
Masson et al.

(10) Patent No.: US 8,784,590 B2
(45) Date of Patent: Jul. 22, 2014

(54) METHOD FOR MANUFACTURING A COMPOSITE MATERIAL CONNECTING ROD HAVING REINFORCED ENDS

(75) Inventors: Richard Masson, Les Loges en Josas (FR); Patrick Dunleavy, Palaiseau (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 323 days.

(21) Appl. No.: 13/264,650

(22) PCT Filed: Apr. 15, 2010

(86) PCT No.: PCT/EP2010/054990
§ 371 (c)(1),
(2), (4) Date: Dec. 30, 2011

(87) PCT Pub. No.: WO2010/119111
PCT Pub. Date: Oct. 21, 2010

(65) Prior Publication Data
US 2012/0103502 A1 May 3, 2012

(30) Foreign Application Priority Data
Apr. 16, 2009 (FR) ...................................... 09 01846

(51) Int. Cl.
*B32B 37/00* (2006.01)
(52) U.S. Cl.
USPC ........................... 156/149; 156/148; 156/172

(58) Field of Classification Search
USPC ........................................... 156/148, 149, 172
See application file for complete search history.

(56) References Cited

U.S. PATENT DOCUMENTS

| 4,704,918 | A | * | 11/1987 | Orkin et al. | 74/579 R |
|---|---|---|---|---|---|
| 4,758,458 | A | * | 7/1988 | Schutze | 428/113 |
| 4,992,313 | A | | 2/1991 | Shobert et al. | |
| 7,597,953 | B2 | * | 10/2009 | Filsinger et al. | 428/292.1 |
| 2009/0317636 | A1 | | 12/2009 | Filsinger et al. | |
| 2011/0129639 | A1 | * | 6/2011 | Dunleavy et al. | 156/92 |

FOREIGN PATENT DOCUMENTS

| EP | 1 798 428 A1 | 6/2007 |
|---|---|---|
| GB | 2207115 A * | 1/1989 |

* cited by examiner

*Primary Examiner* — Jeff Aftergut
(74) *Attorney, Agent, or Firm* — Sughrue Mion, PLLC

(57) ABSTRACT

In the field of aviation, a method of fabricating a composite-material rod. The method comprises a first step of fabricating a mandrel comprising a sleeve of composite material and solid inserts of composite material secured to the ends of said sleeve to constitute a rigid whole. Then, one or more layers of braided fibers are applied around the mandrel by using a fiber-braiding machine. Next, a resin is injected into the layers of braided fibers so as to establish cohesion rigidly bonding the braided fiber layers and at least the ends of the mandrel in order to form a rod body out of composite material having reinforced ends. Finally, respective holes are drilled at each end of the rod body, each hole passing through the layers of braided fibers and also through the corresponding insert.

7 Claims, 3 Drawing Sheets

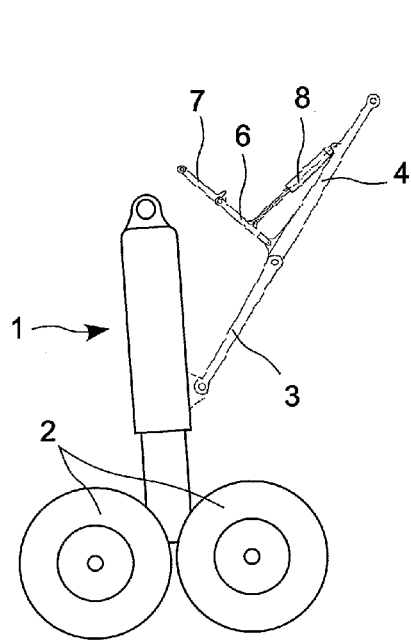
FIG. 1
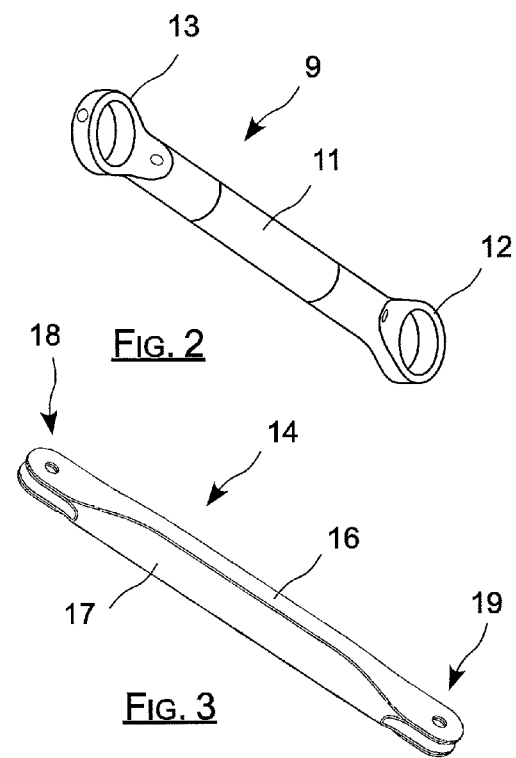
FIG. 2
FIG. 3
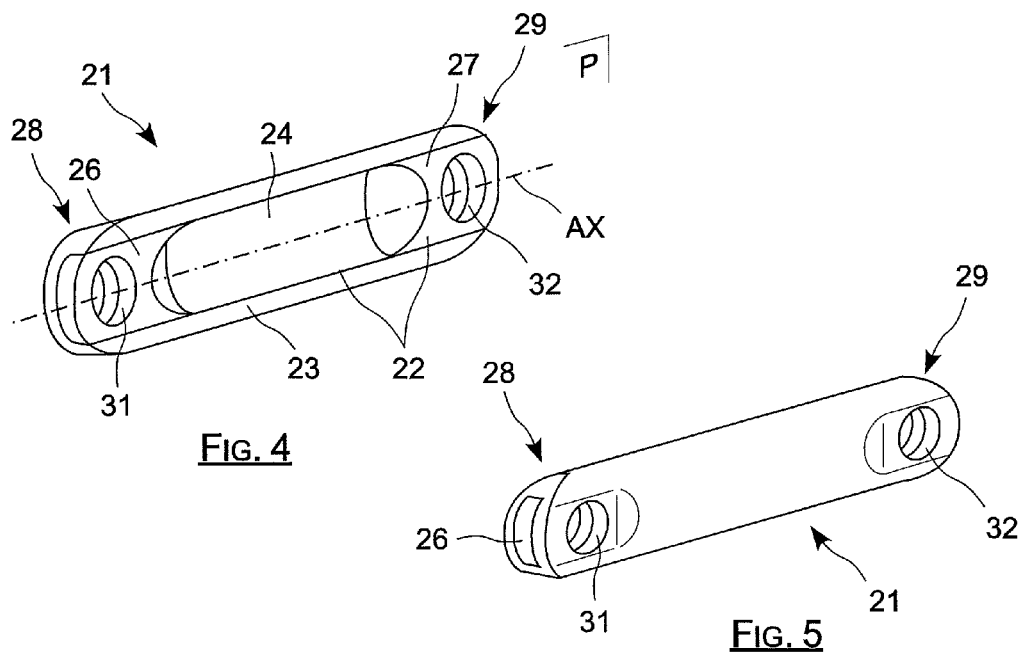
FIG. 4
FIG. 5

METHOD FOR MANUFACTURING A COMPOSITE MATERIAL CONNECTING ROD HAVING REINFORCED ENDS

CROSS REFERENCE TO RELATED APPLICATIONS

This application is a National Stage of International Application No. PCT/EP2010/054990 filed on Apr. 15, 2010, which claims priority from French patent application Ser. No. 09/01846, filed on Apr. 16, 2009, the contents of all of which are incorporated herein by reference in their entirety.

The invention relates to a method of fabricating a rod of composite material such as a rod for an aircraft undercarriage side brace.

BACKGROUND OF THE INVENTION

As shown in FIG. 1, an undercarriage typically comprises a leg 1 having a top end hinged to an element of the structure of an aircraft and a bottom end carrying a wheel set 2. In addition, a locking system is provided to hold the assembly securely in the deployed position, as shown in FIG. 1.

The locking system comprises a side brace made up of two hinged-together rods 3 and 4, the rod 3 being hinged to the leg and the other rod 4 being hinged to the structure of the aircraft, with a stabilizer member also being provided for holding the two rods 3 and 4 in alignment with each other.

The stabilizer member comprises two arms 6 and 7 that are hinged together, the arm 6 being hinged for example to the hinge connecting together the rods 3 and 4 while the arm 7 is hinged to the structure of the aircraft. A system of abutments and springs (not shown) holds the arms 6 and 7 in line with each other when the assembly is deployed. Additionally, an unlocking actuator 8 is interposed between the arm 6 and the rod 4 to unlock the entire assembly by retracting the actuator against a spring.

When landing, or while taxiing, the rods 3 and 4, which are held in alignment, are subjected to large forces that can vary suddenly. For example, when the wheels make contact with the ground, they are immediately set into rotation, against their own inertia.

In a known side brace rod structure as shown in FIG. 2, the rod 9 has a tubular portion 11, typically made of aluminum, with two endpieces 12 and 13 fastened to the ends thereof, which endpieces are solid metal parts made by casting or forging, each presenting an opening so as to constitute a respective lug.

The tubular structure for the body of the rod 9 imparts good buckling behavior thereto, whereas the endpieces 12 and 13, given the large amount of material they comprise, provide the required impact strength. Such an endpiece serves to spread the forces that are applied to the pin received in the endpiece in uniform manner to the body of the tubular rod.

In order to reduce the weight of such a rod, it is known to replace the tubular central body of the rod 9 with a tubular central body that is made of composite material, e.g. based on carbon fibers. However, that solution remains limited by the fact that the metal endpieces 12 and 13 are predominant in determining the overall weight of the rod, given the quantity of material they comprise.

In the configuration disclosed in patent document WO 2009/000925, and as shown in FIG. 3, the rod, referenced 14, presents a structure that is generally tubular (ignoring the endpieces) that is constituted by two thin-walled portions 16 and 17 of open or channel section that are engaged one inside the other and adhesively bonded together. Each end of such a rod carries two extensions of the thin wall of one its portions that are shaped to form a pair of lugs or a "clevis" 18 or 19, each lug being made out of an end portion of the thin wall of one of the component portions.

Given the relatively small thickness of the lugs in that rod, the impact strength of those lugs remains well below that required for utilization as a side brace rod.

OBJECT OF THE INVENTION

The object of the invention is to propose a solution for remedying the above drawbacks.

SUMMARY OF THE INVENTION

To this end, the invention provides a method of fabricating a rod of composite material having reinforced ends, the method comprising the steps of:
  fabricating a mandrel comprising a sleeve and reinforcing inserts secured to the ends of said sleeve in order to constitute a rigid whole;
  applying one or more layers of braided fibers around the mandrel with a machine for braiding reinforcing fibers;
  injecting and polymerizing resin into the layers(s) of braided fibers in order to establish cohesion rigidly bonding the layers of braided fibers and at least the ends of the mandrel together in order to form a rod body having reinforced ends; and
  drilling to make a through orifice at each end of the rod body, each orifice passing through the layers of braided fibers and through the corresponding insert.

The mandrel performs two functions: it constitutes a support on which the fibers are braided in a suitable shape, and because of its reinforced ends it provides the required impact strength in the regions of the rod where the external forces are introduced.

The invention thus makes it possible to make a one-piece rod having reinforced ends while using a technique of braiding on a mandrel in order to build up the successive layers that are of comparable thicknesses.

The saving in weight compared with an aluminum rod having metal endpieces is significant, and the rod that is obtained in this way presents an overall shape without roughnesses or indentations, thereby contributing to reducing the aerodynamic noise from the air flowing around the rod.

The invention also provides a method as defined above, wherein the sleeve and the inserts are fabricated out of a composite material comprising a resin of the same type as the resin injected into the layers surrounding the mandrel.

This provides good cohesion between the inserts and the braided outer layers, thus ensuring good transmission of the forces applied to the insert to the remainder of the rod.

The invention also provides a method as defined above, wherein the sleeve and the inserts are made of a composite material comprising fibers of the same type as the fibers of the layers surrounding the mandrel.

The invention also provides a method as defined above, wherein the inserts extend at least in part inside the ends of the sleeve.

The invention also provides a method as defined above, wherein each insert or each insert portion is fabricated together with all or part of the sleeve to provide optimum cohesion between the inserts and the sleeve.

The invention also provides a method as defined above, wherein first and second ends of the mandrel are fabricated, each comprising an insert and a portion of sleeve, and the two ends are assembled together to form the mandrel.

The invention also provides a method as defined above, wherein each end of the mandrel is obtained by fabricating a first insert half and a first shell together in order to constitute a first half of an end, and by fabricating a second insert half and a second shell together in order to constitute a second half of an end, before assembling the two halves together in order to form an end of the mandrel.

BRIEF DESCRIPTION OF THE FIGURES

FIG. 1, described above, is an overall view of an undercarriage;

FIG. 2, described above, is a perspective view of a known side brace rod for the FIG. 1 undercarriage;

FIG. 3 is a perspective view of a known rod made of composite material;

FIG. 4 is a view of the finished rod of the invention, which rod is shown in longitudinal section;

FIG. 5 is a perspective view of the finished rod of the invention;

DETAILED DESCRIPTION OF THE INVENTION

Figure 6:
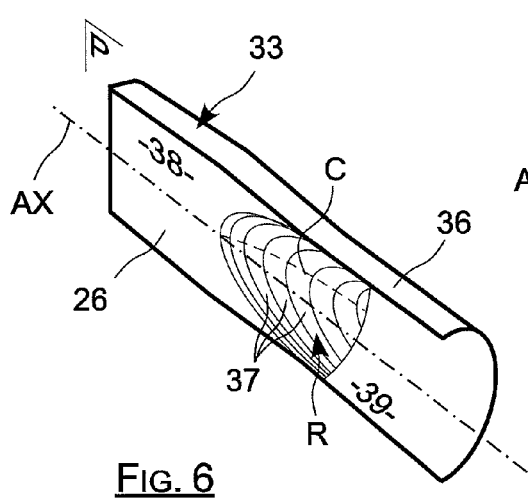
FIG. 6 is a perspective view of a half-end of a mandrel of the rod of the invention.

The idea on which the invention is based is to fabricate a rod out of composite material by braiding fibers around a mandrel having ends, which ends are reinforced in order to increase the mechanical strength of the ends of the rod when considered as a whole.

The mandrel thus performs two functions: it constitutes a support on which the layers of fibers are braided in order to take up the appropriate geometrical shape, and the solid inserts at its ends provide the extra material needed for providing its lugs with impact strength.

As can be seen in FIGS. 4 and 5, the rod of the invention, which extends longitudinally along an axis AX, is made from a mandrel 22 of composite material having one or more layers 23 of reinforcing fibers such as carbon fibers braided around the mandrel.

The mandrel 22 comprises a hollow tubular body 24 forming a sleeve having two inserts 26 and 27 secured thereto, which inserts are engaged in the ends of the tubular hollow body. As can be seen in the figures, each end 28, 29 of the rod 21 includes a hole 31, 32 passing through the corresponding insert 26, 27, together with layers 23 of composite material braided around the insert to constitute a single lug, thus presenting considerable thickness giving it the required impact strength.

Each end of the mandrel is fabricated from two halves 33 and 34 that are symmetrical to each other about a plane of symmetry P of the rod containing the axis AX, and that are placed one against the other before being partially baked.

FIG. 6 shows the half 33 on its own, which half is made in a half-mold (not shown) of a shape that is specially designed for this purpose, i.e. in which the hollow portion presents a cross-section that varies from a rectangular shape to a semicircular shape.

One or more layers of draped composite material are initially applied over the entire bottom surface of the half-mold in order to constitute a shell 36. Additional layers of draped composite material 37 are then applied against one another in a series on the inside of the shell 36 in the region presenting a rectangular cross-section so as to constitute one-half of the insert 26 in the form of a solid piece.

The draped composite material is a carbon fiber fabric that is preimpregnated with resin, the resin being non-solidified so long as it is kept at a temperature that is low enough. The resin is solidified by being baked.

As can be seen in FIG. 6, the additional layers are applied one on another until the last layer 38 that coincides with the plane P. The layers are of outlines that differ from one another, being defined so that the connection surface R that extends from one edge of the layer 38 to the inside face 39 of the shell 36 slopes relative to the inside face of the shell 36.

By means of this arrangement, the transmission of mechanical forces from the insert towards the inside face of the shell takes place without any effect of stress concentration.

In the example shown in the figures, this connection surface R is of a shape that corresponds generally to the end of a half-ellipsoid of revolution. The intersection between this connection surface R and a plane containing the axis AX and perpendicular to the plane P forms a curved arc C that constitutes one-fourth of an ellipse.

The other end half 34 is made in analogous manner in another half-mold. The two half-molds are then placed one against the other so as to bear against each other via the plane P. The core is then inserted between the free portions of the shells in order to press them against the walls of the half-molds against which the layers constituting the shells have been applied.

Thereafter, the mold, which is a heating mold, is activated so as to implement a partial baking cycle on the composite material it contains. Once this baking cycle has been terminated, a first end 35 of the mandrel has been fabricated. Another end of the mandrel 40 is fabricated in identical manner, possibly using the same mold.

Each half-end may also be prebaked separately, prior to the half ends being adhesively bonded together. Under such circumstances, a compression operation may be performed beforehand by pressing a film against the assembly of layers of composite material and establishing a vacuum between said film and the wall of the mold in order to compress the layers.

Figure 7:
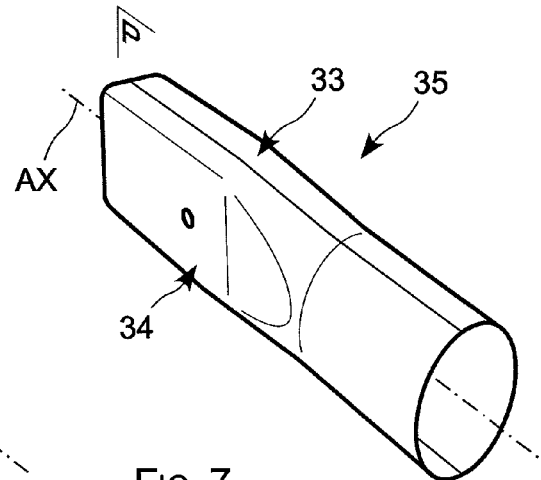
FIG. 7 is a perspective view of an end of a mandrel of the rod of the invention.
Figure 8:
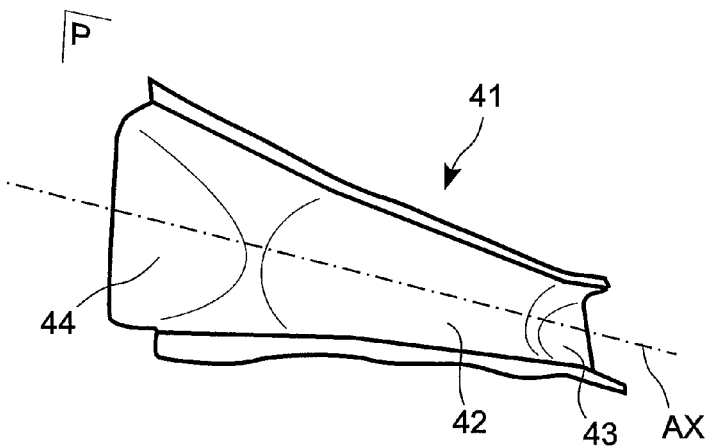
FIG. 8 is a perspective view of the body of the mandrel of the rod of the invention.

In another operation, another mold is used to make two flanks that are to constitute the hollow central portion of the mandrel. As can be seen in FIG. 7, one such flank given reference 41 is fabricated by applying one or more layers of draped composite material in a mold that is designed for this purpose.

This flank 41 is a hollow wall of a shape that is generally symmetrical about a central plane normal to the axis AX. It has a semicylindrical central portion 42 and two end portions 43 and 44, each having a termination that presents a cross-section of a shape that corresponds to the shape of the letter U, each end having a section that varies from the U-shaped section towards the semicircular section of the semicylindrical portion 42.

Once the layers making up this shell have been put into place in the mold, a film is placed on the layers and a vacuum is established in order to press them against the wall of the mold, and then the mold is heated in order to generate a partial baking cycle for the flank. The partial baking may optionally be preceded by an operation of injecting resin.

Another flank 46 is fabricated in identical manner, possibly using the same mold. The mandrel 22 is then assembled from its four component elements constituted by the flanks 41 and 46 and the two ends 35 and 40.

Specifically, the first end 35 is positioned in the end 44 of the flank 41 in which it engages, and the end 40 is placed in the end 44 of the flank 41 in which it engages likewise. At this stage, the second flank 46 may be fitted to the assembly, so that its ends engage on the ends 35 and 40, and so that, together with the other flank 41, it defines a tubular portion in the central region.

These four components that have all been subjected to a partial baking cycle can be assembled to one another by adhesive, or indeed by the resin, thereby constituting a whole that is sufficiently rigid to make the following braiding operation possible. In addition, an additional layer 47 of draped composite material may be applied all around the central portion of the mandrel so as to improve the cohesion of the two flanks 41 and 46 with each other.

Figure 9:
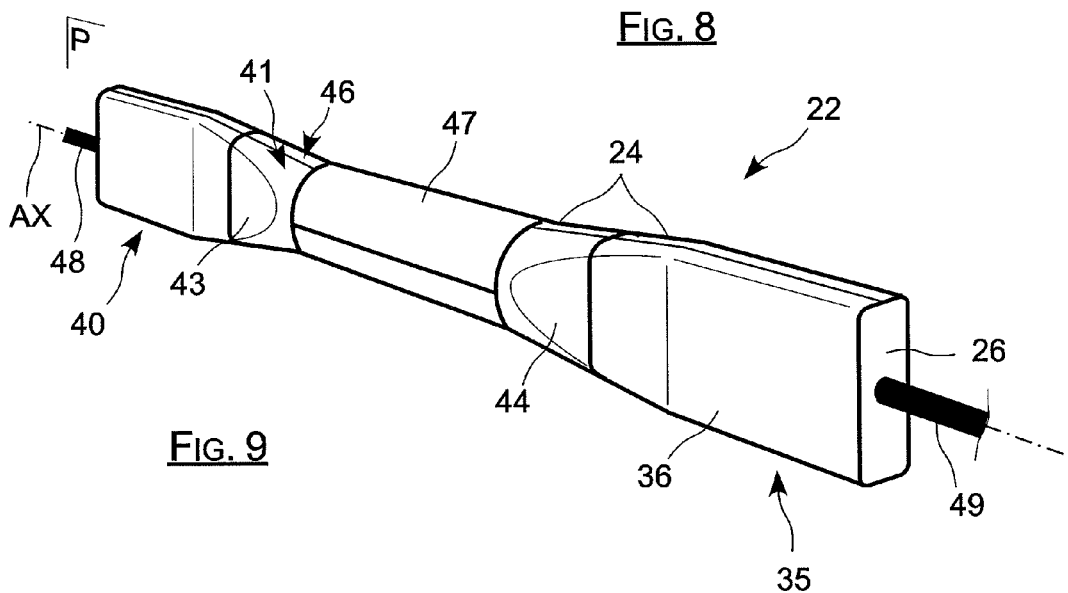
FIG. 9 is a perspective view of the entire mandrel of the rod of the invention.

As can be seen in FIG. 9, a mandrel is thus prepared that is made out of composite material and that comprises a sleeve 24 constituted by the shells of the ends and by the flanks 41 and 46, and that contains a respective solid insert inside each of its ends.

Figure 10:
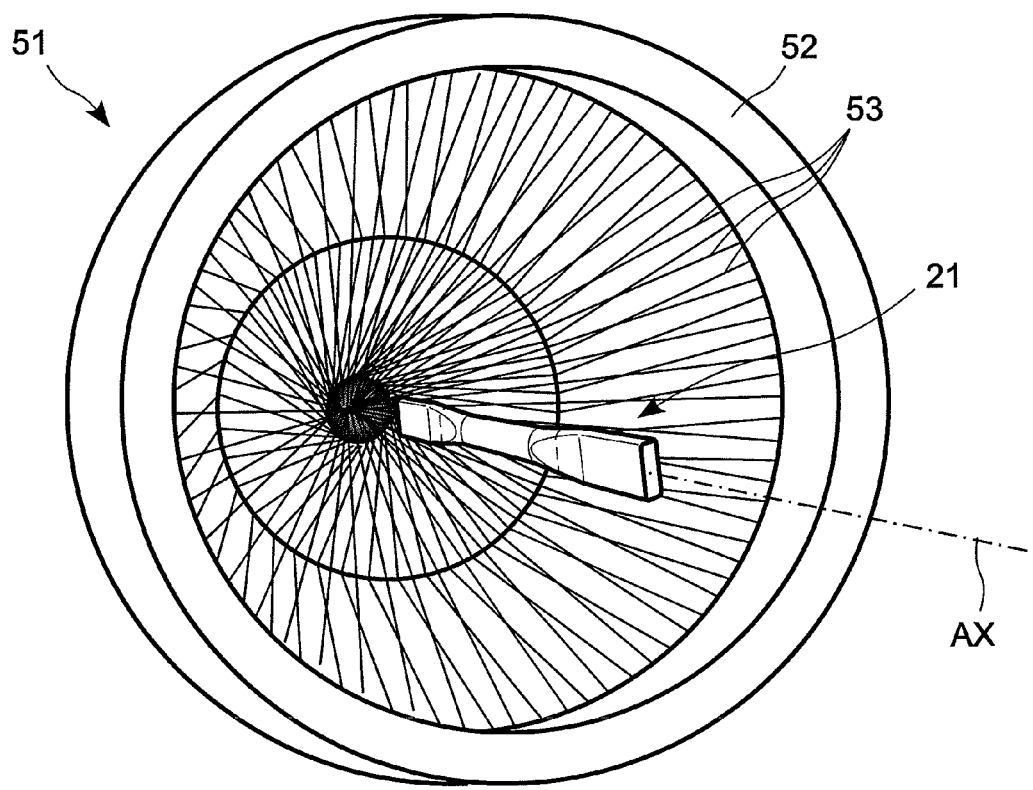
FIG. 10 is a perspective view showing the operation of braiding carbon fibers around the mandrel of the rod of the invention.
Figure 11:
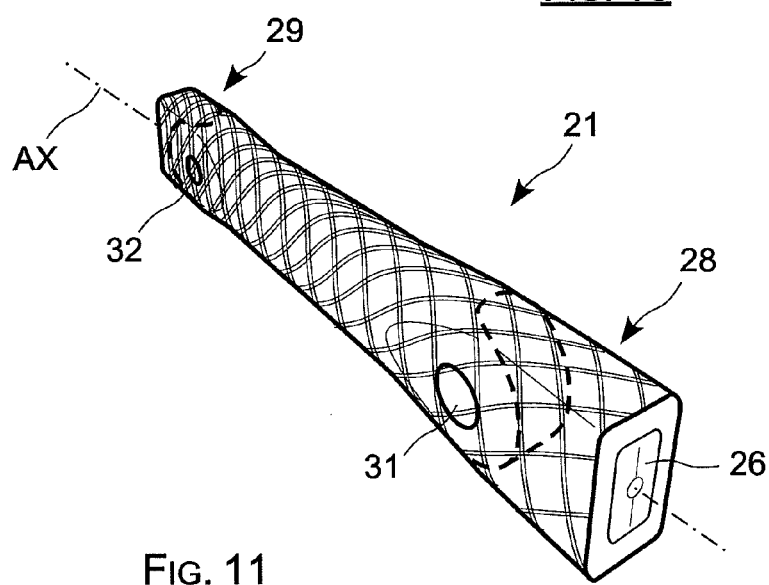
FIG. 11 is a perspective view of the rod of the invention before its ends are cut to shape.

Holes are then formed through each of the ends along the axis AX to enable the mandrel to be secured to two rods 48 and 49 extending it along the axis AX so as to enable it to be mounted in a braiding machine that is shown diagrammatically in FIG. 10, where it is given overall reference 51.

The mandrel 22 is then installed in the braiding machine 51 that essentially comprises a carrier ring 52 having a series of fiber spools mounted on its rear face and carrying fibers such as carbon fibers, the spools being mounted on rotatable supports. The fibers 53 meet in a region that is situated substantially on the axis AX while being offset along said axis relative to the plane of the carrier ring 52.

As can be seen in FIG. 10, the carrier ring 52 is centered on the axis AX, while extending in a plane that is normal to said axis. Once the braiding cycle has been launched, the mandrel 22 is moved along the axis AX relative to the carrier ring 52, thereby causing a sock of fibers to be braided on the outside face of the mandrel 24.

In operation, the speed of the mandrel relative to the ring is adjusted so that the fibers that are braided around the mandrel are oriented at 60° relative to the axis AX at the ends of the rod, and the speed is adjusted so that the same fibers are inclined at 45° relative to the axis AX in the middle region of the rod.

Several passes are then carried out so as to build up a plurality of braided fiber layers surrounding the mandrel.

In general, each layer is of substantially constant thickness, even though that thickness does vary to some extent with varying orientation of the fibers relative to the axis AX, which orientation depends on the region of the rod that is under consideration, as mentioned above.

Furthermore, the thickness of each braided layer can also be modified as a function of the size of the fibers used and of the number of spools employed. The quantity of material that is deposited is then greater or smaller.

It is also possible to provide for the layers of braided fibers to extend over a fraction only of the length of the rod, e.g. over the lugs, so as to reinforce the rod locally in those regions.

It is thus possible to modulate the local thickness of the assembly constituted by the various layers surrounding the mandrel, e.g. in such a manner as to optimize the uniformity of the mechanical stresses to which the rod is subjected under given mechanical loading.

Once the various braided layers have been made, the raw part as constituted in this way, i.e. the part comprising the mandrel surrounded by the various layers of fibers, is placed in a mold.

Resin is then injected so as to impregnate the various layers of braided fibers completely and reach the outer face of the mandrel so as to ensure the best possible cohesion between the mandrel and the layers, in particular at the ends, in order to optimize the transmission of the forces that are applied to each of the inserts towards the peripheral layers of braided fibers.

After the resin has been injected, the mold is controlled to implement a baking cycle that serves both to bake completely the layers of composite material surrounding the mandrel and also to finish off the baking of the elements that constitute the mandrel.

Once this baking has been completed, the resulting part is pierced at each of its ends in order to form the holes 31 and 32 passing through respective ones of the inserts and the peripheral layers of braided composite material, so as to form the lugs of the rod.

In addition, a cutting and/or sawing operation is performed at the ends of the rod in order to give the lugs a semicylindrical shape concentrically around the holes, thereby determining the outside shape of the rod.

A metal ring forming a bearing for each lug is then mounted in each of the holes 31, 32.

In the example of the figures, the resulting rod is a rod having two single lugs in which the bearings 31 and 32 are oriented parallel to each other. However, the method is also suitable for making rods in which the lugs are turned relative to each other about the axis AX.

For example, such a rod having two lugs that are oriented at right angles relative to each other can be fabricated by making a sleeve of the same type as that shown in the figures, but in which the ends are turned through one-fourth of a turn relative to each other.

Given the ability of the braiding operation to adapt to a mandrel of any shape, it is thus possible to make a rod in which the rods are oriented relative to each other at almost any angle.

Furthermore, in the example shown in the figures, the inserts are fabricated by draping, i.e. by applying layers of fabric that have been preimpregnated with resin, however they could equally well be fabricated out of composite material made up of short non-woven fibers that are amalgamated in random directions by being embedded in a resin.

The mandrel is made out of composite material having a resin of the same type as that which is injected into the braided outer layers in order to obtain better cohesion with the outer layers, and the inserts advantageously comprise fibers of the same type as those in the braided outer layers in order to present great mechanical strength.

That said, the mandrel could be made of some other material, both concerning the sleeve and concerning the reinforcing inserts, providing those elements present the required characteristics concerning their mechanical strength and their ability to ensure good cohesion between themselves and the braided outer layer.

The tubular central region of the sleeve may advantageously be filled with an inert gas such as argon in order to avoid any condensation or similar phenomenon occurring during the cycles in the lifetime of the rod.

Furthermore, it should be observed that the method of the invention may advantageously be applied to fabricating helicopter blades and the blades of jet engines out of composite material, and more generally to fabricating any component comprising a body of composite material having an end that needs to be reinforced.

What is claimed is:

1. A method of fabricating a composite-material rod having reinforced ends, the method comprising the steps of:

fabricating a mandrel comprising a sleeve extending longitudinally and reinforcing inserts secured to the ends of said sleeve in order to constitute a rigid whole;

applying one or more layers of braided fibers around the mandrel by moving it longitudinally into a machine for braiding reinforcing fibers surrounding it all along its length;

injecting and polymerizing resin into the one or more layers(s) of braided fibers in order to establish cohesion rigidly bonding the layers of braided fibers and at least the ends of the mandrel-together in order to form a rod body having reinforced ends; and drilling to make a through orifice at each end of the rod body, each orifice passing through the layers of braided fibers and through the corresponding insert.

2. A method according to claim 1, wherein the sleeve and the inserts are fabricated out of a composite material comprising a resin of the same type as the resin injected into the layers surrounding the mandrel.

3. A method according to claim 1, wherein the sleeve and the inserts are made of a composite material comprising fibers of the same type as the fibers of the layers surrounding the mandrel.

4. A method according to claim 1, wherein the inserts extend at least in part inside the ends of the sleeve.

5. A method according to claim 4, wherein each insert or each insert portion is fabricated together with all or part of the sleeve to provide optimum cohesion between the inserts and the sleeve.

6. A method according to claim 4, wherein first and second ends of the mandrel are fabricated, each comprising an insert and a portion of sleeve, and the two ends are assembled together to form the mandrel.

7. A method according to claim 6, wherein each end of the mandrel is obtained by fabricating a first insert half and a first shell together in order to constitute a first half of an end, and by fabricating a second insert half and a second shell together in order to constitute a second half of an end, before assembling the two halves together in order to form an end of the mandrel.

* * * * *